J. B. FULTON.
DOUBLE SICKLE FOR MOWERS AND HARVESTERS.
APPLICATION FILED DEC. 5, 1910.
1,017,863.
Patented Feb. 20, 1912.
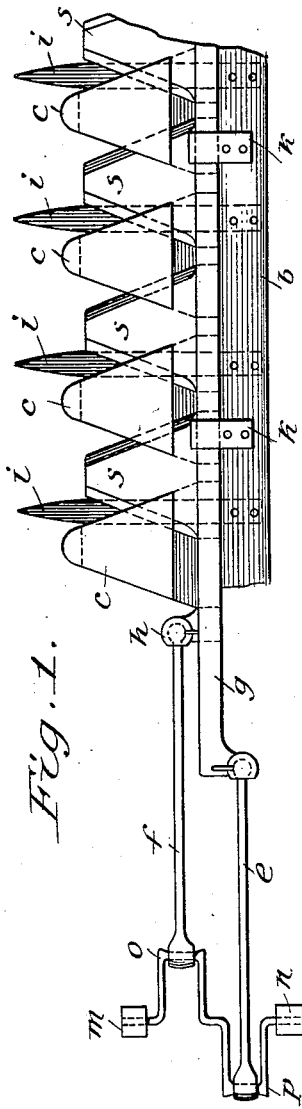
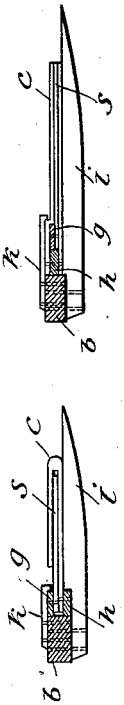
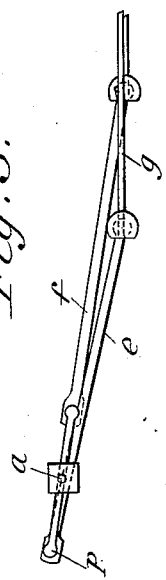
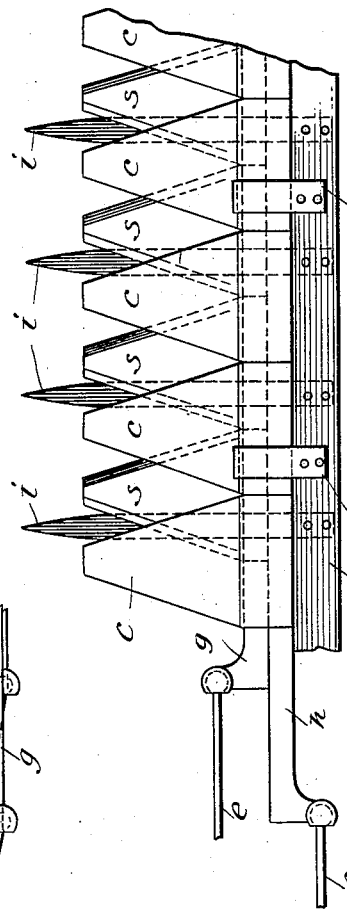
Witnesses:
James B. Fulton,
Inventor:
by Clem. F. Kimball,
Attorney.

UNITED STATES PATENT OFFICE.

JAMES B. FULTON, OF MARNE, IOWA.

DOUBLE SICKLE FOR MOWERS AND HARVESTERS.

1,017,863.  Specification of Letters Patent.  Patented Feb. 20, 1912.

Application filed December 5, 1910. Serial No. 595,938.

*To all whom it may concern:*

Be it known that I, JAMES B. FULTON, a citizen of the United States, residing at Marne, in the county of Cass and State of Iowa, have invented a new and useful Double Sickle for Mowers and Harvesters, of which the following is a specification.

My invention relates to improvements in sickles and finger bars for mowing machines and harvesters for cutting hay and grain, in which two reciprocating sickles are operated to cut against each other; and the objects of my invention are, first, to provide with a single gearing a higher cutting speed; second, to provide a double cutting surface or edge; third, to provide a moving guard to assist in the cutting operation; fourth, to provide a means to prevent choking of the sickle in wet or heavy grass and grain.

I attain these objects by the mechanism illustrated in the accompanying drawing, in which—

Figure 1 is a plan of finger bar with sickles and pitmen; Fig. 2 is an end elevation and cross section of finger bar and sickles; Fig. 3 is a side elevation of the pitman section of sickle bars and pitman shaft; Fig. 4 is a plan of the finger bars and sickles showing a different position and form of sickles; and Fig. 5 is an end elevation and cross section of the finger bar and sickle shown in Fig. 4.

Similar letters refer to similar parts throughout the several views.

The principle of my invention is that I employ two sickles driven by the same crank shaft and made to cut one upon the other; the two sickles being carried upon an ordinary finger bar adapted to receive them. A finger bar $b$ is provided with the usual guards $i, i$.

$a$ is the ordinary pitman shaft on a mower or harvester, but instead of employing a single crank and pin, I employ a double crank having the journals $o$ and $p$. Upon the finger bar $b$ I employ two sickles $g$ and $h$. One of the sickles, as $g$, carries a set of knives or sections $s, s$, and another sickle $h$ carries a set of knives $d$. The edges of the knives or sections $s$ and the knives or sections $d$ slide together, their sharp edges being in the same plane. Upon the sickle carrying the lower set of sections or knives $d$, as sickle $g$, are placed guards $c, c$. This guard may be made as a continuation of the sections or knives $d$ and be turned over, as shown in Fig. 1, or may be fastened to the sickle bar $h$, carrying the lower set of knives or sections $d$, so the guards $c$ cover the sections $s$ of the sickle $g$. Suitable guides, as $k, k$, may be supplied attached to the finger bar to hold said sickles $g$ and $h$ in place. Attached to the sickles $g$ and $h$ are the pitmen $f$ and $e$ respectively, engaging the cranks $p$ and $o$ respectively. The stroke of the crank $p$ is similar to an ordinary crank of a mower or harvester, and the stroke of the crank $o$ is the same as that of the crank $p$, but is oppositely disposed to that of the crank $p$. The pitmen $f$ and $e$ attach in the usual manner to the respective sickle bars $h$ and $g$.

The crank shaft $a$ operates in any suitable boxing $m$ and $n$ and is geared as any other mower or harvester for the proper amount of revolution to the amount of the forward movement of the finger bar $b$ to throw the grain or hay into the sickles of the machine. The crank $p$ moves the sickle $g$ so that the knife or section $s$ moves from the center of the guard $i$ to the next adjacent guard $i$. And likewise the crank $o$ moves the sickle $h$ so that the sections $d$ and the guards $c$ are moved successively from the center of one guard $i$ to the center of the next guard $i$. Thus by the rotation of the crank shaft $a$, the crank journal $p$ throws the sickle bar $g$, with its sections $s, s$, from the center of the guard $i$ to the center of the next guard $i$ and the crank journal $o$ moves the sickle $h$ with the knives $d, d$ from the center of one guard $i$ to the next guard $i$, but in the opposite direction from which the knives or sections $s$ of the sickle $g$ traveled. Thus with the same time of revolution of the shaft $a$ the relative motion for cutting purposes of the two sickles is doubled over what it would be were the cutting done by one sickle against the guards of the sickle bar. By this means, to get the same cutting effect for the forward movement, I am able to reduce the speed of the crank shaft to one-half of its speed when only a single sickle is used. I find too that the reduction of the multiplication of speed in the gearing reduces the friction and causes the machine to work much easier. I also produce a double movement of the cutting medium which prevents clogging in heavy or wet grain or hay and adds greatly to the efficiency of the machine.

The essence of my invention is the use of two sickles, bringing their cutting edges together and providing a guard to temporarily hold in position the hay or grain to be cut. The guards $i$ are not used for cutting purposes but only to divide the grain or hay to be cut and to protect the sickles.

What I claim and desire to secure by Letters Patent is:—

1. The combination of a finger bar and two sickle bars operated from the same crank shaft, one sickle bar carrying cutting knives, and the other sickle bar carrying guard sections, partially enveloping said cutting knives, the said cutting knives arranged to operate against the said guards enveloping them.

2. In a mower or harvester, the combination of a finger bar and guards holding two sickles having cutting knives arranged to work against each other and guards upon one sickle, the knives of the other sickle working between said guards and the knives of the first named sickle.

3. In a mower or reaper, the combination of a finger bar and guards, holding two sickles having cutting knives arranged to work against each other and guards upon one sickle, the knives of the other sickle working between said guards and the knives of the first named sickle and a double crank with crank journals oppositely placed and pitmen to operate said sickles.

4. In a mower or harvester, the combination of a finger bar, a double crank, pitmen, and sickle having guards attached to and operated therewith and a second sickle with knives operating upon the first sickle and between the knives thereof and said guards.

JAMES B. FULTON.

Witnesses:
ETHEL G. INGRAHAM,
HARRY PETERSON.

---

Copies of this patent may be obtained for five cents each, by addressing the "Commissioner of Patents, Washington, D. C."